United States Patent
Yang et al.

(10) Patent No.: US 11,948,236 B2
(45) Date of Patent: Apr. 2, 2024

(54) METHOD AND APPARATUS FOR GENERATING ANIMATION, ELECTRONIC DEVICE, AND COMPUTER READABLE MEDIUM

(71) Applicant: BEIJING BAIDU NETCOM SCIENCE TECHNOLOGY CO., LTD., Beijing (CN)

(72) Inventors: Shaoxiong Yang, Beijing (CN); Yang Zhao, Beijing (CN); Chen Zhao, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 214 days.

(21) Appl. No.: 17/527,473

(22) Filed: Nov. 16, 2021

(65) Prior Publication Data
US 2022/0180584 A1 Jun. 9, 2022

(30) Foreign Application Priority Data
Dec. 9, 2020 (CN) .......................... 202011430467.1

(51) Int. Cl.
*G06T 13/40* (2011.01)
*G06T 13/20* (2011.01)
(Continued)

(52) U.S. Cl.
CPC ............ *G06T 13/40* (2013.01); *G06T 13/205* (2013.01); *G06V 20/46* (2022.01); *G06V 40/165* (2022.01);
(Continued)

(58) Field of Classification Search
CPC ..... G06T 13/40; G06T 13/205; G06V 40/174; G06V 40/171; G06V 20/46; G06V 40/165;
(Continued)

(56) References Cited

U.S. PATENT DOCUMENTS 6,661,418 B1   12/2003  McMillian et al.
2019/0130628 A1  5/2019  Cao et al.
(Continued)

FOREIGN PATENT DOCUMENTS

CN    1971621 A      5/2007
CN    104835190 A    8/2015
(Continued)

OTHER PUBLICATIONS

Shi et al ("Research on key technology of three-dimensional talking-head driven by the Chinese text". Book: Network Security and Communication Engineering; First Published: 2015; pp. 597-600; "Research on key technology of three-dimensional talking-head driven by (taylorfrancis.com)").*

(Continued)

*Primary Examiner* — Xilin Guo
(74) *Attorney, Agent, or Firm* — Knobbe, Martens, Olson & Bear, LLP (57) ABSTRACT

The present disclosure discloses a method and apparatus for generating animation. An implementation of the method may include: processing a to-be-processed material to generate a normalized text; analyzing the normalized text to generate a Chinese pinyin sequence of the normalized text; generating a reference audio based on the to-be-processed material; and obtaining an animation of facial expressions corresponding to the timing sequence of the reference audio based on the Chinese pinyin sequence and the reference audio.

14 Claims, 3 Drawing Sheets

(51) Int. Cl.
*G06V 20/40* (2022.01)
*G06V 40/16* (2022.01)
*G10L 15/26* (2006.01)

(52) U.S. Cl.
CPC .......... *G06V 40/171* (2022.01); *G06V 40/174* (2022.01); *G10L 15/26* (2013.01)

(58) Field of Classification Search
CPC ...... G06F 40/129; G06F 40/163; G06F 40/53; G06F 16/3329; G10L 21/10; G10L 15/26; G10L 13/00; G10L 2021/105; G10L 13/033; G10L 2015/025; G09B 19/06
See application file for complete search history.

(56) References Cited

U.S. PATENT DOCUMENTS

2019/0180752 A1* 6/2019 Xiao ..................... G10L 15/26
2020/0342056 A1* 10/2020 Yang ..................... G06N 5/022

FOREIGN PATENT DOCUMENTS

| CN | 109377540 A | 2/2019 |
| CN | 110751708 A | 2/2020 |
| CN | 111988658 A | 11/2020 |
| JP | 2008140364 | 6/2008 |
| JP | 2019032529 | 2/2019 |

OTHER PUBLICATIONS

Perng et al ("Image Talk: a real time synthetic talking head using one single image with Chinese text-to-speech capability". Date Added to IEEE Xplore: Aug. 6, 2002).*
Jul. 12, 2022 Japanese Office Action from related JP App. No. 2021-131563 (2 pgs).

* cited by examiner

METHOD AND APPARATUS FOR GENERATING ANIMATION, ELECTRONIC DEVICE, AND COMPUTER READABLE MEDIUM

CROSS-REFERENCE TO RELATED APPLICATIONS

This application claims priority to Chinese Patent Application No. 202011430467.1, filed with the China National Intellectual Property Administration (CNIPA) on Dec. 9, 2020, which is incorporated herein by reference in its entirety.

TECHNICAL FIELD

The present disclosure relates to the field of computer technology, particularly to the field of artificial intelligence technology such as computer vision, speech, augmented reality and deep learning, and more particularly to a method and apparatus for generating animation, an electronic device, a computer readable medium and a computer program product.

BACKGROUND

With the rapid development of computer technology and animation technology, requirements of people for the animated mouth shape in a human-machine interaction are increasingly high. As to how to generate, based on an inputted text or audio, animation of facial expressions of a virtual character which conforms to an audio stream, there is an urgent need for the research of animation of Chinese mouth shape.

A method of generating the animation of Chinese mouth shape is generally based on deep learning, and a mapping relationship between an audio and a facial expression coefficient is directly learned. Due to the influence of the speaking style and face shape of a speaker in training data, it is difficult to learn the audio-facial expression coefficient mapping relationship. Moreover, since there is a huge amount of audio data (contents, tone qualities, tones, amplitudes, etc.) in the world, it is impossible to learn all sentences and all audio variables. For example, an audio corresponding to a sentence is not in a training set or the audio of the sentence differs greatly from the audio of the same sentence in the training set. Thus, it is difficult to ensure that a model would correctly output animation of facial expressions conforming to an inputted audio.

SUMMARY

A method and apparatus for generating an animation, an electronic device, a computer readable medium and a computer program product are provided.

According to a first aspect, some embodiments of the present disclosure provide a method for generating animation, the method includes: processing to-be-processed material to generate a normalized text; analyzing the normalized text to generate a Chinese pinyin sequence of the normalized text; generating a reference audio based on the to-be-processed material; and obtaining animation of facial expressions corresponding to a timing sequence of the reference audio based on the Chinese pinyin sequence and the reference audio.

According to a second aspect, some embodiments of the present disclosure provide an apparatus for generating animation, the apparats includes: a processing unit, configured to process to-be-processed material to generate a normalized text; an analyzing unit, configured to analyze the normalized text to generate a Chinese pinyin sequence of the normalized text; a generating unit, configured to generate a reference audio based on the to-be-processed material; and an obtaining unit, configured to obtain animation of facial expressions corresponding to a timing sequence of the reference audio based on the Chinese pinyin sequence and the reference audio.

According to a third aspect, some embodiments of the present disclose provide an electronic device, the electronic includes: at least one processor; and a storage device, communicated with the at least one processor, where the storage device stores an instruction executable by the at least one processor, and the instruction is executed by the at least one processor, to enable the at least one processor to perform the method according to any one of embodiments of the first aspect.

According to a fourth aspect, some embodiments of the present disclosure provide a non-transitory computer readable storage medium, storing a computer instruction, wherein the computer instruction is used to cause a processor to perform the method according to any one of embodiments of the first aspect.

In a fifth aspect, some embodiments of the present disclose provide a computer program product comprising a computer program, the computer program, when executed by a processor, causes the processor to implement the method according to any one of embodiments of the first aspect.

It should be understood that the content described in this part is not intended to identify key or important features of embodiments of the present disclosure, and is not used to limit the scope of the present disclosure. Other features of the present disclosure will be easily understood through the following description.

BRIEF DESCRIPTION OF THE DRAWINGS

Accompanying drawings are used for a better understanding of the scheme, and do not constitute a limitation to the present disclosure. Here.

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

Figure 1:
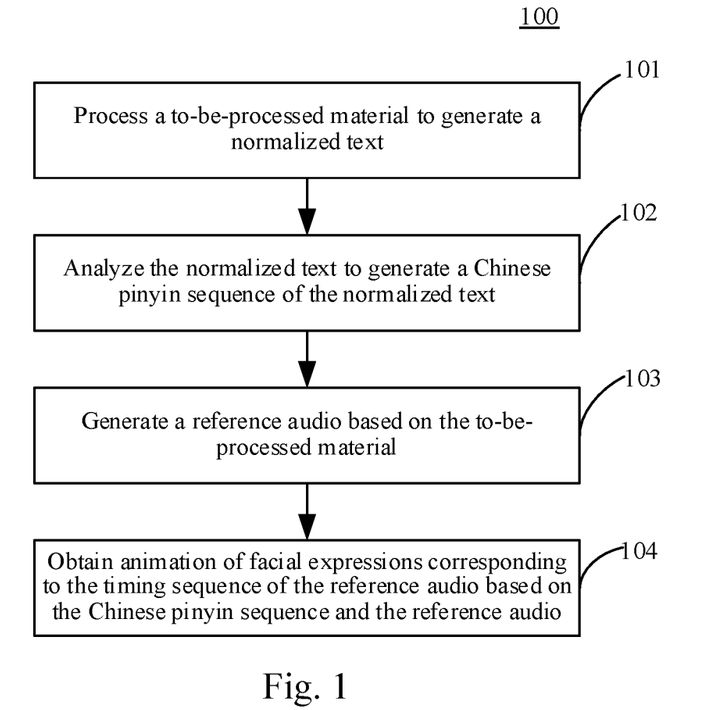
FIG. 1 is a flowchart of a method for generating animation according to an embodiment of the present disclosure.

FIG. 1 illustrates a flow 100 of a method for generating animation according to an embodiment of the present disclosure. The method for generating animation includes:

Step 101, processing to-be-processed material to generate a normalized text.

In this embodiment, an execution body on which the method for generating animation runs may acquire the to-be-processed material directly from a client or read the to-be-processed material from a memory. For the to-be-processed material (picture, text, audio, or the like) acquired from the client, the execution body may use the method for generating animation in embodiments of the present disclosure to generate an animation video corresponding to the to-be-processed material, the generated animation video includes images in which a virtual character's face is speaking, realizing a real-time generation effect.

In this embodiment, the to-be-processed material refers to a material required for the generation of animation of facial expressions. The to-be-processed material includes a picture to be processed, a text to be processed, an audio to be processed, and the like. The normalized text is a Chinese text, and the Chinese text includes only Chinese character(s). For different kinds of to-be-processed materials, the normalized text is generated in different ways.

When the to-be-processed material includes the text to be processed, TN (Text normalization) processing is required to be first performed on the text to be processed, to remove a blank line and an abnormal character in the text to be processed and translate a symbol such as a number, a date, time and money in the text to be processed into Chinese character(s), thus obtaining a normalized text. For example, there are three kinds of texts to be processed: Bus No. 108; 12.03; and 10:23:10. After the normalization processing is performed on the to-be-processed texts respectively, the normalized texts are obtained as: "Bus number one hundred and eight," "twelve and zero point three yuan," and "twenty three minutes and ten seconds pass ten O'clock."

In some alternative implementations of this embodiment, the to-be-processed material includes the audio to be processed. The processing a to-be-processed material to generate a normalized text includes: performing speech recognition processing on the audio to be processed to generate a Chinese text; and performing text normalization processing on the Chinese text to generate a normalized text.

In this alternative implementation, when the to-be-processed material includes an audio to be processed, a speech recognition is first performed on the audio to be processed to generate a Chinese text. Then, the text normalization processing is performed on the Chinese text to obtain a normalized text. Thus, the diversity of the processing for the to-be-processed material is realized.

Step 102, analyzing the normalized text to generate a Chinese pinyin sequence of the normalized text.

In this embodiment, some Chinese pinyin translation software may be adopted to translate each Chinese character in the normalized text into a Chinese pinyin, and the respective translated Chinese pinyins are combined to obtain the Chinese pinyin sequence of the normalized text. Alternatively, the Chinese pinyin translation software may be adopted to translate each Chinese character(s) in the normalized text sequentially into Chinese pinyin(s).

Step 103, generating a reference audio based on the to-be-processed material.

In this embodiment, for different kinds of to-be-processed materials, it is possible that the to-be-processed materials are first converted into normalized texts and the normalized texts are then converted into reference audios through a speech synthesis. Alternatively, a normalized text may be generated into a corresponding reference audio through TTS (text to speech) software.

Alternatively, when the to-be-processed material includes an audio to be processed, the audio to be processed may be directly used as the reference audio. Alternatively, audio processing such as recording, clipping and converting is performed on the audio to be processed to obtain the reference audio.

Further, if the to-be-processed material includes the text to be processed, after inputting the text to be processed to generate the reference audio, the client inputs an audio to be processed, then the reference audio generated from the text to be processed may be replaced with the inputted audio to be processed.

Step 104, obtaining animation of facial expressions corresponding to a timing sequence of the reference audio based on the Chinese pinyin sequence and the reference audio.

In this embodiment, the method of obtaining the animation of facial expressions corresponding to the timing sequence of the reference audio based on the Chinese pinyin sequence and the reference audio mainly includes: searching, through a pre-annotated dictionary, face image element sequences corresponding to the Chinese pinyin sequence; extracting, in the reference audio, time stamps corresponding to the respective pinyins in the Chinese pinyin sequence; and stitching face image element sequences corresponding to the Chinese pinyins in the Chinese pinyin sequence based on the time stamps, to obtain the face image element sequence corresponding to the timing sequence of the reference audio. The animation of facial expressions is obtained based on the face image element sequence corresponding to the timing sequence of the reference audio. Alternatively, the reference audio includes audio(s)/pronunciation(s) of Chinese character(s) arranged in time sequence, and the time sequence of the audio(s)/pronunciation(s) of Chinese characters in the reference audio is referred to as the timing sequence of the reference audio.

It should be noted that, when the frame rate of face image element sequences is the same as the time standard of the time stamps, the face image element sequences may be directly stitched based on the time stamps. When the frame rate of the face image element sequence is different from the time standard of the time stamps, processing such as stretching, interpolation, and time-series smoothing is performed on the face image element sequences, and then, the face image element sequences may be stitched based on the time stamps.

In this embodiment, the face image element sequence corresponding to the timing sequence of the reference audio includes face image element sequences corresponding to a plurality of Chinese pinyins. A face element sequence is composed of a plurality of face elements, and the face element are basic element that may represent a facial expression. For example, the face element may include: a facial expression coefficient, a three-dimensional face grid, two-dimensional face key points, or face feature points.

Further, the obtaining the animation of facial expressions based on the face image element sequence is different according to the content of a face image element. For example, when the face element refers to two-dimensional face key points, a three-dimensional face model corresponding to the two-dimensional face key points is searched from a pre-annotated two-dimensional to three-dimensional face transformation library, to obtain a sequence of three-dimensional face models. The sequence of three-dimensional face models are rendered to obtain a sequence of video frame pictures. The sequence of video frame pictures are synthesized to obtain the animation of facial expressions.

In some alternative implementations of this embodiment, the obtaining the animation of facial expressions corresponding to the timing sequence of the reference audio based on the Chinese pinyin sequence and the reference audio includes:

obtaining a three-dimensional face grid sequence corresponding to the timing sequence of the reference audio based on the Chinese pinyin sequence and the reference audio; and obtaining the animation of facial expressions based on the three-dimensional face grid sequence corresponding to the timing sequence of the reference audio.

In this alternative implementation, for each Chinese pinyin in the Chinese pinyin sequence, a three-dimensional face grid sequence corresponding to the each Chinese pinyin may be outputted by a pre-trained model or searched from a pre-annotated dictionary. The three-dimensional face grid sequences corresponding to the Chinese pinyin sequence are processed based on the timing sequence of the reference audio to obtain the three-dimensional face grid sequence corresponding to the timing sequence of the reference audio. Further, a plurality of video frame pictures may be obtained by performing three-dimensional to two-dimensional image transformation processing on the three-dimensional face grid sequence corresponding to the timing sequence of the reference audio. The animation of facial expressions may be obtained by synthesizing the video frame pictures.

In this alternative implementation, the three-dimensional face grid sequence corresponding to the timing sequence of the reference audio is obtained through the Chinese pinyin sequence and the reference audio, and the animation of facial expressions is obtained from the three-dimensional face grid sequence corresponding to the timing sequence of the reference audio, which provides an alternative implementation for the generation of the animation of facial expressions and ensures the reliability and fluency of the generation of the animation.

In some alternative implementations of this embodiment, the obtaining a three-dimensional face grid sequence corresponding to the timing sequence of the reference audio based on the Chinese pinyin sequence and the reference audio includes: aligning the reference audio and the Chinese pinyins in the Chinese pinyin sequence according to the timing sequence, to obtain time stamps of the respective Chinese pinyins; searching in an pinyin-grid dictionary to obtain a three-dimensional face grid sequence corresponding to the each Chinese pinyin, the pinyin-grid dictionary being used to represent a corresponding relationship between a Chinese pinyin and a three-dimensional face grid sequence; and stitching, based on the time stamps, three-dimensional face grid sequences corresponding to the Chinese pinyins in the Chinese pinyin sequence to obtain the three-dimensional face grid sequence corresponding to the timing sequence of the reference audio.

In this alternative implementation, a time stamp includes a start time and an end time of each Chinese pinyin in the reference audio. The Chinese pinyins may be aligned with the pronunciation of the respective Chinese characters in the reference audio through a pre-trained pinyin-audio alignment model, and thus, the time stamp of the each Chinese pinyin may be obtained.

In this alternative implementation, the pinyin-grid dictionary may be annotated and obtained through the following approach: when a voice actor reads a Chinese pinyin, the face of the voice actor is scanned through a three-dimensional scanner, to obtain a pinyin-grid dictionary including a three-dimensional face grid sequence corresponding to the each Chinese pinyin one by one.

In this alternative implementation, after the Chinese pinyin sequence is obtained, the pinyin-grid dictionary is queried using a keyword to obtain the three-dimensional face grid sequences corresponding to the Chinese pinyins in the Chinese pinyin sequence.

In this alternative implementation, through the time stamps collected from the reference audio, stitching according to the timing sequence is performed on the three-dimensional face grid sequences corresponding to the Chinese pinyin sequence, which improves the reliability of the stitching of the three-dimensional face grid sequences and provides a reliable basis for the generation of the facial expression animation.

In some alternative implementations of this embodiment, the obtaining the animation of facial expressions based on the three-dimensional face grid sequence corresponding to the timing sequence of the reference audio includes: rendering the three-dimensional face grid sequence corresponding to the timing sequence of the reference audio, to obtain a sequence of video frame pictures; and synthesizing the sequence of video frame pictures to obtain the animation of facial expressions.

In this alternative implementation, the animation of facial expressions is obtained by rendering the three-dimensional face grid sequence corresponding to the timing sequence of the reference audio and by synthesizing the sequence of video frame pictures. The operation of the obtaining animation of facial expressions is simple, which increases the reliability of the generated animation of facial expressions.

According to the method for generating animation provided in the embodiment of the present disclosure, the to-be-processed material is first processed to generate the normalized text. Next, the normalized text is analyzed to generate the Chinese pinyin sequence of the normalized text. Then, the reference audio is generated based on the to-be-processed material. Finally, the animation of facial expressions corresponding to the timing sequence of the reference audio is obtained based on the Chinese pinyin sequence and the reference audio. In this way, the to-be-processed material is respectively converted into the Chinese pinyin sequence and the reference audio. Based on the timing sequence of the reference audio and the Chinese pinyin sequence, the animation of facial expressions corresponding to the timing sequence of the reference audio is obtained without annotating massive audios and massive facial expressions, thus saving the development cost. The animation of facial expressions generated based on the Chinese pinyin sequence may not only support all audio sentences, but also improve the reliability of the generation of the animation of facial expressions.

Figure 2:
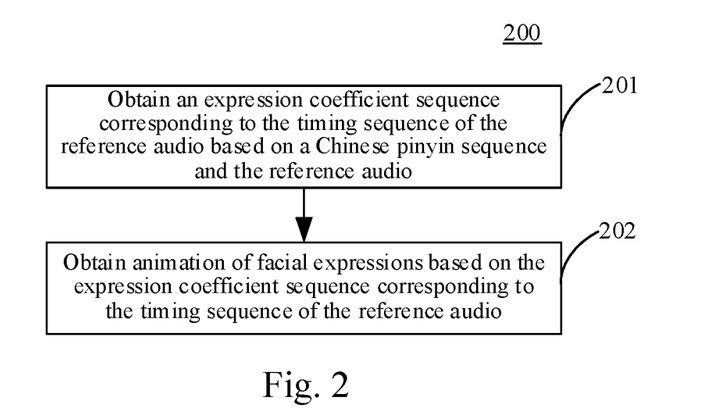
FIG. 2 is a flowchart of a method of obtaining animation of facial expressions corresponding to a timing sequence of reference audios according to an embodiment of the present disclosure.

In some alternative implementations of this embodiment, as shown in FIG. 2, a method of obtaining animation of facial expressions corresponding to a timing sequence of a reference audio includes the following steps:

Step 201, obtaining an expression coefficient sequence corresponding to the timing sequence of a reference audio based on a Chinese pinyin sequence and the reference audio.

In this embodiment, the expression coefficient sequence is a sequence composed of a plurality of expression coefficients. Further, in this embodiment, the expression coefficient is a deformation parameter value corresponding to a feature portion represented by an image of expression base, and is generally identified by a matrix. There are 51 parameters in one expression coefficient matrix. The 51 parameters are in one-to-one corresponding relationship to 51 expression bases. Through the weighted sum of the expression coefficient and the expression bases, various facial mouth shapes and facial expressions may be presented.

One Chinese pinyin may correspond to one expression coefficient sequence, each expression coefficient sequence corresponds to a plurality of video frames, and the plurality of video frames are video frames related to the pronunciation of the Chinese pinyin. The expression coefficient sequence corresponding to the timing sequence of the reference audio may be composed of one or more expression coefficient sequences corresponding to the Chinese pinyin(s).

In this alternative implementation, the expression coefficient sequence corresponding to the timing sequence of the reference audio is also an expression coefficient file. In the expression coefficient file, a line of data corresponds to a video frame, and the frame rate of the video frame may be obtained through a pre-calibration, for example, the frame rate is 30 fps.

Step 202, obtaining animation of facial expressions based on the expression coefficient sequence corresponding to the timing sequence of the reference audio.

In this alternative implementation, through the weighted sum of an expression coefficient and an expression base, a facial mouth shape and a facial expression may be determined. Since the expression base is a known parameter has a given quantity, after the expression coefficient sequence is determined, the animation of facial expressions corresponding to the to-be-processed material is also determined accordingly.

In this alternative implementation, the expression coefficient sequence corresponding to the timing sequence of the reference audio is first obtained, and then the animation of facial expressions is obtained from the expression coefficient sequence, which provides an alternative implementation for the obtaining of the animation of facial expressions and improves the reliability of the obtaining of the animation of facial expressions.

Figure 3:
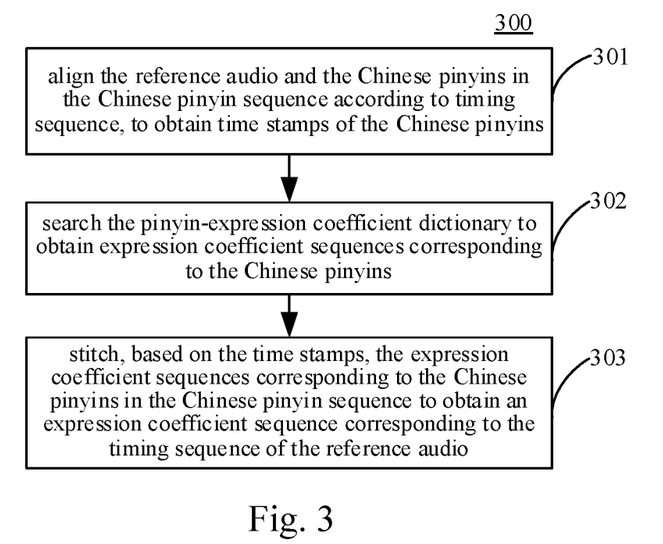
FIG. 3 is a flowchart of a method of obtaining an expression coefficient sequence corresponding to the timing sequence of the reference audios according to an embodiment of the present disclosure.

In some alternative implementations of this embodiment, as shown in FIG. 3, a method of obtaining an expression coefficient sequence corresponding to a timing sequence of a reference audio includes the following steps:

Step 301, aligning the reference audio and the Chinese pinyins in the Chinese pinyin sequence according to timing sequence, to obtain time stamps of the respective Chinese pinyins.

In this alternative implementation, the time stamp includes a start time and an end time of each Chinese pinyin in the reference audio. The each Chinese pinyin may be aligned with the pronunciation of the Chinese character corresponding to the Chinese pinyin in the reference audio through a pre-trained pinyin-audio alignment model, and thus, the time stamp of the each Chinese pinyin may be obtained.

Step 302, searching in a pinyin-expression coefficient dictionary to obtain expression coefficient sequences corresponding to the Chinese pinyins.

Here, the pinyin-expression coefficient dictionary is used to represent a corresponding relationship between a Chinese pinyin and an expression coefficient sequence.

The pinyin-expression coefficient dictionary may be calibrated and obtained in various ways. Alternatively, three-dimensional face grid sequences of a voice actor reading all Chinese pinyins (e.g., 409 Chinese pinyins without tones) are recorded, and a three-dimensional face grid sequence in one-to-one corresponding relationship to each Chinese pinyin is determined. According to the principle of three-dimensional face expression recognition, an expression coefficient sequence in one-to-one corresponding relationship to the each Chinese pinyin is calculated from the three-dimensional face grid sequence, to obtain the pinyin-expression coefficient dictionary including the expression coefficient sequence in one-to-one corresponding relationship to the each Chinese pinyin.

In some alternative implementations of this embodiment, the pinyin-expression coefficient dictionary is annotated and obtained by: recording a video of a voice actor reading a Chinese pinyin, to obtain a pinyin video in one-to-one corresponding relationship with the each Chinese pinyin; performing a face key point detection on each video frame in each pinyin video; and calculating an expression coefficient based on detected face key points, to obtain the pinyin-expression coefficient dictionary including the expression coefficient sequence in one-to-one corresponding relationship with the each Chinese pinyin.

In this alternative implementation, for example, there are 150 face key points, and the 150 face key points have corresponding relationships with 150 three-dimensional points in dense three-dimensional points of a three-dimensional face model, and binding is completed based on the corresponding relationship.

An expression base (blend shape) has a total of 51 parameters ($bs1, bs2, bs3 \ldots bs51$), and there is an expression coefficient ($p1, p2, p3 \ldots p51$) corresponding to each expression base. The three-dimensional face model is obtained through $bs1*p1+bs2*p2+bs3*p3+ \ldots +bs51*p51$. A two-dimensional projection is performed on the bound 150 points in the three-dimensional face model, to obtain 150 two-dimensional points after the projection. A loss is calculated through the 150 two-dimensional points and the detected 150 face key points. A solution is obtained through a least-squares iteration (the obtained solution refers to parameters of an expression coefficient, and there are 51 parameters), such that the loss therebetween is minimized, and thus, the final expression coefficient having 51 parameters is obtained.

In this implementation, the pinyin videos are obtained through the recording, and the face key point detection is performed on the each video frame in the each pinyin video. After the tones are removed, there are 409 Chinese pinyins (pinyins with different tones refer to the same Chinese pinyin). Therefore, it is only required to annotate a small number of pinyins to obtain the pinyin-expression coefficient dictionary, which saves the time and cost of annotating a large amount of data, and improves the efficiency of the generation of the animation.

Step 303, stitching, based on the time stamps, expression coefficient sequences corresponding to the Chinese pinyins in the Chinese pinyin sequence to obtain an expression coefficient sequence corresponding to the timing sequence of the reference audio.

In this alternative implementation, in the process of stitching the expression coefficient sequences corresponding to the Chinese pinyins, processing such as timing sequence stretching, longitudinal superposition and timing sequence smoothing may be performed on the facial expression coefficient sequence corresponding to the each Chinese pinyin, to ensure that the switching between the mouth shapes and expressions of adjacent words in the generated animation of facial expressions are quite natural.

According to the alternative implementation, the method of obtaining the expression coefficient sequence corresponding to the timing sequence of the reference audio is provided. The time stamps of the Chinese pinyins are obtained through the reference audio, the expression coefficient corresponding to the each Chinese pinyin in the Chinese pinyin sequence is searched, and the expression coefficient sequences corresponding to all the Chinese pinyins in the Chinese pinyin sequence are stitched according to the time stamps, to obtain the expression coefficient sequence corresponding to the timing sequence of the reference audio. Accordingly, the smoothness in the timing sequence of the facial expression coefficient and the connection switching naturalness of the facial expression coefficient are ensured.

Figure 4:
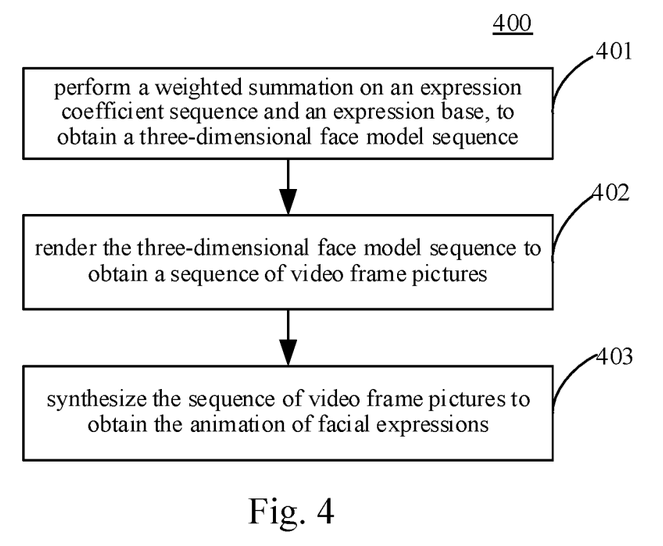
FIG. 4 is a flowchart of a method of obtaining animation of facial expressions according to an embodiment of the present disclosure.

In some alternative implementations of this embodiment, as shown in FIG. 4, a method of obtaining animation of facial expressions includes the following steps:

Step 401, performing a weighted summation on an expression coefficient sequence and an expression base, to obtain a three-dimensional face model sequence.

In this alternative implementation, the expression base has a total of 51 parameters (bs1, bs2, bs3 . . . bs51), and there is an expression coefficient (p1, p2, p3 . . . p51) corresponding to each expression base. A three-dimensional face model is obtained through bs1*p1+bs2*p2+bs3*p3+ . . . +bs51*p51.

Step 402, rendering the three-dimensional face model sequence to obtain a sequence of video frame pictures.

In this alternative implementation, through a rendering tool, the three-dimensional face model sequence may be rendered into a sequence of pictures of a virtual character image.

Step 403, synthesizing the sequence of video frame pictures to obtain the animation of facial expressions.

According to the alternative implementation, the method of obtaining the animation of facial expressions is provided. The weighted summation is performed on the expression coefficient sequence corresponding to the timing sequence of the reference audio and the expression base, to obtain the sequence of three-dimensional face models. The sequence of three-dimensional face models is rendered to obtain the sequence of video frame pictures. The sequence of video frame pictures is synthesized to obtain the animation of facial expressions. Therefore, the stability of the generation of the animation is ensured.

Figure 5:
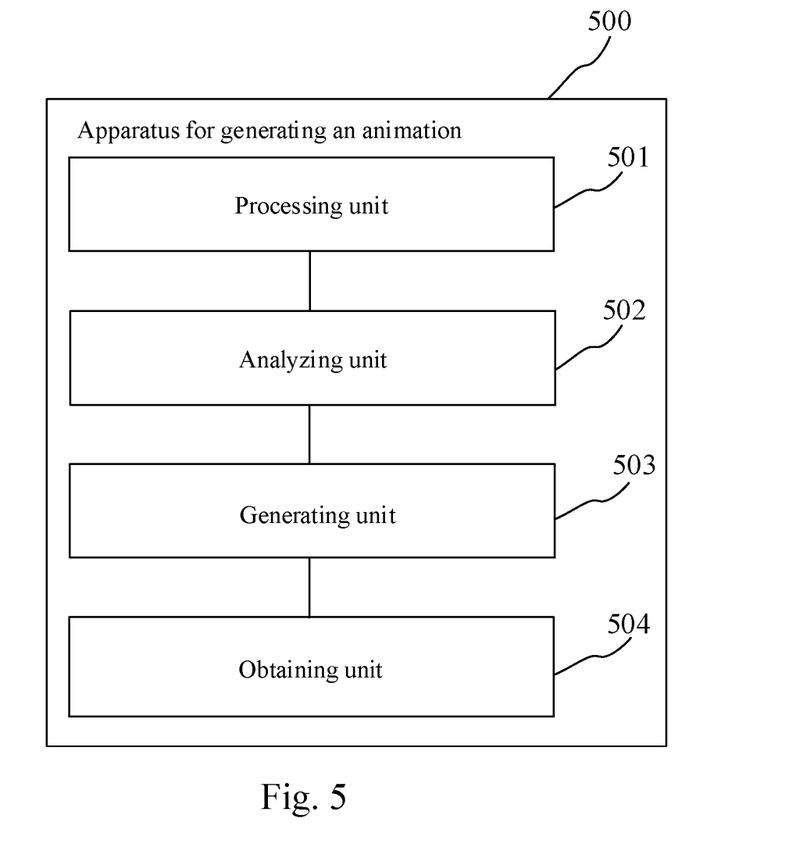
FIG. 5 is a schematic structural diagram of an apparatus for generating animation according to an embodiment of the present disclosure.

Further referring to FIG. 5, as an implementation of the method shown in the above drawings, the present disclosure provides an embodiment of an apparatus for generating an animation. The embodiment of the apparatus corresponds to the embodiment of the method shown in FIG. 1, and the apparatus may be applied in various electronic devices.

As shown in FIG. 5, the apparatus 500 for generating an animation provided in this embodiment includes: a processing unit 501, an analyzing unit 502, a generating unit 503 and an obtaining unit 504. Here, the processing unit 501 may be configured to process to-be-processed material to generate a normalized text. The analyzing unit 502 may be configured to analyze the normalized text to generate a Chinese pinyin sequence of the normalized text. The generating unit 503 may be configured to generate a reference audio based on the to-be-processed material. The obtaining unit 504 may be configured to obtain animation of facial expressions corresponding to a timing sequence of the reference audio based on the Chinese pinyin sequence and the reference audio.

In this embodiment, for specific processes of the processing unit 501, the analyzing unit 502, the generating unit 503 and the obtaining unit 504 in the apparatus 500 for generating animation, and their technical effects, reference may be respectively made to relative descriptions of step 101, step 102, step 103 and step 104 in the corresponding embodiment of FIG. 1, which will not be repeatedly described here.

In some alternative implementations of this embodiment, the obtaining unit 504 includes a coefficient obtaining sub-unit (not shown) and an expression obtaining sub-unit (not shown). Here, the coefficient obtaining sub-unit may be configured to obtain an expression coefficient sequence corresponding to the timing sequence of the reference audio based on the Chinese pinyin sequence and the reference audio. The expression obtaining sub-unit may be configured to obtain the animation of facial expressions based on the expression coefficient sequence corresponding to the timing sequence of the reference audio.

In some alternative implementations of this embodiment, the coefficient obtaining sub-unit includes a timing sequence aligning module (not shown), a coefficient searching module (not shown) and a coefficient stitching module (not shown). Here, the timing sequence aligning module may be configured to align the reference audio and the respective Chinese pinyins in the Chinese pinyin sequence according to the timing sequence, to obtain time stamps of the Chinese pinyins. The coefficient searching module may be configured to search in annotated pinyin-expression coefficient dictionary to obtain an expression coefficient sequence corresponding to the each of the Chinese pinyins, the pinyin expression coefficient dictionary being used to represent a corresponding relationship between a Chinese pinyin and an expression coefficient sequence. The coefficient stitching module may be configured to stitch, based on the time stamps, expression coefficient sequences corresponding to the Chinese pinyins in the Chinese pinyin sequence, to obtain the expression coefficient sequence corresponding to the timing sequence of the reference audio.

In some alternative implementations of this embodiment, the pinyin expression coefficient dictionary is annotated and obtained through a recording module (not shown), a detecting module (not shown) and a calculating module (not shown). Here, the recording module may be configured to record a video of a voice actor reading each Chinese pinyin, to obtain pinyin videos in one-to-one corresponding relationship with Chinese pinyins. The detecting module may be configured to perform a face key point detection on each video frame in each of the pinyin videos. The calculating module may be configured to calculate an expression coefficient based on detected face key points, to obtain the pinyin-expression coefficient dictionary including expression coefficient sequences in one-to-one corresponding relationship with the Chinese pinyins.

In some alternative implementations of this embodiment, the expression obtaining sub-unit includes a coefficient weighting module (not shown), a coefficient rendering module (not shown) and a coefficient synthesizing module. Here, the coefficient weighting module may be configured to perform a weighted summation on the expression coefficient sequence corresponding to the timing sequence of the reference audio and an expression base, to obtain a three-dimensional face model sequence. The coefficient rendering module may be configured to render the sequence of three-dimensional face models to obtain a sequence of video frame pictures. The coefficient synthesizing module may be configured to synthesize the sequence of video frame pictures to obtain the animation of facial expressions.

In some alternative implementations of this embodiment, the to-be-processed material includes an audio to be processed, and the processing unit 501 includes a recognizing sub-unit (not shown) and a processing sub-unit (not shown). Here, the recognizing sub-unit may be configured to perform speech recognition processing on the to-be-processed audio to generate a Chinese text. The processing sub-unit may be configured to perform text normalization processing on the Chinese text to generate a normalized text.

In some alternative implementations of this embodiment, the obtaining unit 504 includes a grid obtaining sub-unit (not shown) and a video obtaining sub-unit (not shown). Here, the grid obtaining sub-unit may be configured to obtain a three-dimensional face grid sequence corresponding to the timing sequence of the reference audio based on the Chinese pinyin sequence and the reference audio. The video obtaining sub-unit may be configured to obtain the animation of facial expressions animation based on the three-dimensional face grid sequence corresponding to the timing sequence of the reference audio.

In some alternative implementations of this embodiment, the grid obtaining sub-unit includes a time aligning module (not shown), a grid searching module (not shown) and a grid obtaining module (not shown). Here, the time aligning module may be configured to perform the align the reference audio and the Chinese pinyins in the Chinese pinyin sequence according to the timing sequence, to obtain the time stamps of the each Chinese pinyins. The grid searching module may be configured to search in an annotated pinyin grid dictionary to obtain a three-dimensional face grid sequence corresponding to the each of the Chinese pinyins, the pinyin grid dictionary being used to represent a corresponding relationship between a Chinese pinyin and a three-dimensional face grid sequence. The grid obtaining module may be configured to stitch, based on the time stamp, three-dimensional face grid sequences corresponding to the Chinese pinyins in the Chinese pinyin sequence to obtain the three-dimensional face grid sequence corresponding to the timing sequence of the reference audio.

In some alternative implementations of this embodiment, the video obtaining sub-unit includes a grid rendering module (not shown) and a grid synthesizing module (not shown). Here, the grid rendering module is configured to render the three-dimensional face grid sequence corresponding to the timing sequence of the reference audio, to obtain a video frame picture sequence. The grid synthesizing module is configured to synthesize the video frame picture sequence to obtain the facial expression animation.

According to the apparatus for generating animation provided in the embodiment of the present disclosure, the processing unit 501 first processes the to-be-processed material to generate the normalized text. Next, the analyzing unit 502 analyzes the normalized text to generate the Chinese pinyin sequence of the normalized text. Then, the generating unit 503 generates the reference audio based on the to-be-processed material. Finally, the obtaining unit 504 obtains the animation of facial expressions corresponding to the timing sequence of the reference audio based on the Chinese pinyin sequence and the reference audio. In this way, the to-be-processed material is respectively converted into the Chinese pinyin sequence and the reference audio. Based on the Chinese pinyin sequence and the timing sequence of the reference audio, the animation of facial expressions corresponding to the timing sequence of the reference audio is obtained without annotating massive audios and massive facial expressions, thus saving the development cost. The facial expression animation generated based on the Chinese pinyin sequence may not only support all audio sentences, but also improve the reliability of the generation of the facial animation expression.

According to an embodiment of the present disclosure, the present disclosure further provides an electronic device and a readable storage medium.

Figure 6:
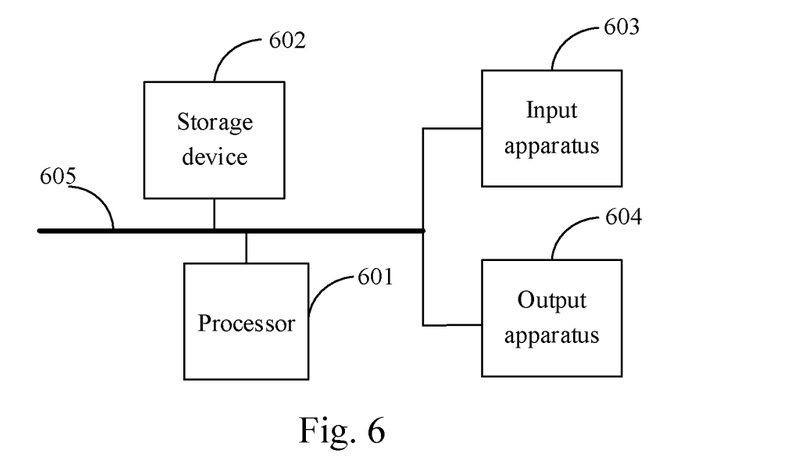
FIG. 6 is a block diagram of an electronic device used to implement a method for generating animation according to embodiments of the present disclosure.

As shown in FIG. 6, FIG. 6 is a block diagram of an electronic device of the method for generating animation according to embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 6, which is a block diagram of an electronic device of a method for generating animation according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 6, one processor 601 is used as an example.

The memory 602 is a non-transitory computer readable storage medium provided by the present disclosure. The memory stores instructions executable by at least one processor, so that the at least one processor performs the method for generating animation provided by embodiment of the present disclosure. The non-transitory computer readable storage medium of the present disclosure stores computer instructions for causing a computer to perform the method for generating animation provided by embodiments of the present disclosure.

The memory 602, as a non-transitory computer readable storage medium, may be used to store non-transitory software programs, non-transitory computer executable programs and modules, such as program instructions/modules corresponding to the method for generating animation in embodiments of the present disclosure (for example, the processing unit 501, the analyzing unit 502, and the generating unit 503 obtaining unit 504 shown in FIG. 5). The processor 601 executes the non-transitory software programs, instructions, and modules stored in the memory 602 to execute various functional applications and data processing of the server, that is, to implement the method for generating animation in the foregoing method embodiment.

The memory 602 may include a storage program area and a storage data area, where the storage program area may store an operating system and at least one function required application program; and the storage data area may store data created by the use of the electronic device according to the method for generating animation, etc. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device of the method for generating animation through a network. Examples of the above network include but are not limited to the Internet, intranet, local area network, mobile communication network, and combinations thereof.

The electronic device of the method for generating animation may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal inputs related to user settings and function control of the electronic device of the method for generating information, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks. The computer system may include a client and a server. The client and the server are generally far from each other and usually interact through the communication network. The relationship between the client and the server is generated by computer programs that run on the corresponding computer and have a client-server relationship with each other.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for generating animation, comprising:
processing to-be-processed material to generate a normalized text;
analyzing the normalized text to generate a Chinese pinyin sequence of the normalized text;
generating a reference audio based on the to-be-processed material;
aligning the reference audio and respective Chinese pinyins in the Chinese pinyin sequence according to a timing sequence of the reference audio, to obtain time stamps of the respective Chinese pinyins;
searching in a pinyin-expression coefficient dictionary to obtain an expression coefficient sequence corresponding to each of the Chinese pinyins, the pinyin-expression coefficient dictionary being used to represent a corresponding relationship between a Chinese pinyin and an expression coefficient sequence;
stitching, based on the time stamps, expression coefficient sequences corresponding to the Chinese pinyins in the Chinese pinyin sequence, to obtain an expression coefficient sequence corresponding to the timing sequence of the reference audio; and
obtaining animation of facial expressions corresponding to the timing sequence of the reference audio based on the expression coefficient sequence corresponding to the timing sequence of the reference audio.

2. The method according to claim 1, wherein the pinyin-expression coefficient dictionary is obtained by annotating through:
recording a video of a voice actor reading each Chinese pinyin, to obtain pinyin videos in one-to-one corresponding relationship with the Chinese pinyins;
performing a face key point detection on each video frame in each of the pinyin videos; and
calculating an expression coefficient based on detected face key points, to obtain the pinyin-expression coefficient dictionary including expression coefficient sequences in one-to-one corresponding relationship with the Chinese pinyins.

3. The method according to claim 1, wherein the obtaining the animation of the facial expressions based on the expression coefficient sequence corresponding to the timing sequence of the reference audio comprises:
performing a weighted summation on the expression coefficient sequence corresponding to the timing sequence of the reference audio and an expression base, to obtain a sequence of three-dimensional face models;
rendering the sequence of three-dimensional face models to obtain a sequence of video frame pictures; and
synthesizing the sequence of video frame pictures to obtain the animation of facial expressions.

4. The method according to claim 1, wherein the to-be-processed material includes an audio to be processed, and the processing the to-be-processed material to generate the normalized text comprises:
performing speech recognition processing on the audio to be processed to generate a Chinese text; and
performing text normalization processing on the Chinese text to generate the normalized text.

5. A non-transitory computer readable storage medium, storing computer instructions, wherein the computer instructions are used to cause a processor to perform the method according to claim 1.

6. A method for generating animation, comprising:
processing to-be-processed material to generate a normalized text;
analyzing the normalized text to generate a Chinese pinyin sequence of the normalized text;
generating a reference audio based on the to-be-processed material;
aligning the reference audio and the Chinese pinyins in the Chinese pinyin sequence according to a timing sequence of the reference audio, to obtain time stamps of the Chinese pinyins;
searching in a pinyin-grid dictionary to obtain a three-dimensional face grid sequence corresponding to the each of the Chinese pinyins, the pinyin-grid dictionary being used to represent a corresponding relationship between a Chinese pinyin and a three-dimensional face grid sequence;
stitching, based on the time stamps, three-dimensional face grid sequences corresponding to the Chinese pinyins in the Chinese pinyin sequence, to obtain a three-dimensional face grid sequence corresponding to the timing sequence of the reference audio;
obtaining the animation of facial expressions based on the three-dimensional face grid sequence corresponding to the timing sequence of the reference audio.

7. The method according to claim 6, wherein the obtaining the animation of facial expressions based on the three-dimensional face grid sequence corresponding to the timing sequence of the reference audio comprises:
rendering the three-dimensional face grid sequence corresponding to the timing sequence of the reference audios, to obtain a sequence of video frame pictures; and
synthesizing the sequence of video frame pictures to obtain the animation of facial expressions.

8. An electronic device, comprising:
at least one processor; and
a storage device connected with the at least one processor, wherein the storage device stores instructions executable by the at least one processor, and the instructions, when executed by the at least one processor, cause the at least one processor to perform the method according to claim 6.

9. The device according to claim 8, wherein the obtaining the animation of facial expressions based on the three-dimensional face grid sequence corresponding to the timing sequence of the reference audio comprises:
rendering the three-dimensional face grid sequence corresponding to the timing sequence of the reference audios, to obtain a sequence of video frame pictures; and
synthesizing the sequence of video frame pictures to obtain the animation of facial expressions.

10. A non-transitory computer readable storage medium, storing computer instructions, wherein the computer instructions are used to cause a processor to perform the method according to claim 6.

11. An electronic device, comprising:
at least one processor; and
a storage device connected with the at least one processor, wherein the storage device stores instructions executable by the at least one processor, and the instructions, when executed by the at least one processor, cause the at least one processor to perform operations comprising:
processing to-be-processed material to generate a normalized text;

analyzing the normalized text to generate a Chinese pinyin sequence of the normalized text;

generating a reference audio based on the to-be-processed material;

aligning the reference audio and respective Chinese pinyins in the Chinese pinyin sequence according to a timing sequence of the reference audio, to obtain time stamps of the respective Chinese pinyins;

searching in a pinyin-expression coefficient dictionary to obtain an expression coefficient sequence corresponding to each of the Chinese pinyins, the pinyin-expression coefficient dictionary being used to represent a corresponding relationship between a Chinese pinyin and an expression coefficient sequence;

stitching, based on the time stamps, expression coefficient sequences corresponding to the Chinese pinyins in the Chinese pinyin sequence, to obtain an expression coefficient sequence corresponding to the timing sequence of the reference audio; and obtaining animation of facial expressions corresponding to the timing sequence of the reference audio based on the expression coefficient sequence corresponding to the timing sequence of the reference audio.

12. The device according to claim 11, wherein the pinyin-expression coefficient dictionary is obtained by annotating through:

recording a video of a voice actor reading each Chinese pinyin, to obtain pinyin videos in one-to-one corresponding relationship with the Chinese pinyins;

performing a face key point detection on each video frame in each of the pinyin videos; and calculating an expression coefficient based on detected face key points, to obtain the pinyin-expression coefficient dictionary including expression coefficient sequences in one-to-one corresponding relationship with the Chinese pinyins.

13. The device according to claim 11, wherein the obtaining the animation of the facial expressions based on the expression coefficient sequence corresponding to the timing sequence of the reference audio comprises:

performing a weighted summation on the expression coefficient sequence corresponding to the timing sequence of the reference audio and an expression base, to obtain a sequence of three-dimensional face models;

rendering the sequence of three-dimensional face models to obtain a sequence of video frame pictures; and synthesizing the sequence of video frame pictures to obtain the animation of facial expressions.

14. The device according to claim 11, wherein the to-be-processed material includes an audio to be processed, and the processing the to-be-processed material to generate the normalized text comprises:

performing speech recognition processing on the audio to be processed to generate a Chinese text; and performing text normalization processing on the Chinese text to generate the normalized text.

\* \* \* \* \*